(12) United States Patent
Baum (10) Patent No.: US 6,356,043 B2
(45) Date of Patent: Mar. 12, 2002

(54) MOTOR CONTROLLER POWER SWITCH ARRANGEMENT

(76) Inventor: Matthew C. Baum, 861 Washington Ave., Township of Washington, NJ (US) 07676

( * ) Notice: Subject to any disclaimer, the term of this patent is extended or adjusted under 35 U.S.C. 154(b) by 0 days.

(21) Appl. No.: 09/815,773

(22) Filed: Mar. 22, 2001

Related U.S. Application Data (63) Continuation-in-part of application No. 09/392,402, filed on Sep. 9, 1999, now abandoned.

(51) Int. Cl.$^7$ ................................................. H02P 5/34
(52) U.S. Cl. .................... 318/254; 318/801; 363/56.01; 363/131
(58) Field of Search ................................ 318/800, 801; 363/55, 56.01, 109

(56) References Cited

U.S. PATENT DOCUMENTS

| | | | | |
|---|---|---|---|---|
| 4,458,305 A | * | 7/1984 | Buckle et al. ............... | 363/141 |
| 4,670,833 A | * | 6/1987 | Sachs ......................... | 363/132 |
| 5,119,286 A | * | 6/1992 | Huss et al. .................. | 363/147 |
| 5,170,337 A | * | 12/1992 | Borowiec et al. ........... | 363/147 |
| 5,365,424 A | * | 11/1994 | Deam et al. ................ | 363/144 |
| 5,459,655 A | * | 10/1995 | Mori et al. .................. | 363/132 |
| 5,460,244 A | * | 10/1995 | Tanahashi ................... | 187/293 |
| 5,506,765 A | * | 4/1996 | Nakata et al. ............... | 363/98 |
| 5,841,649 A | * | 11/1998 | Willett et al. ................ | 363/98 |
| 6,058,031 A | * | 5/2000 | Lyons et al. ................. | 363/67 |
| 6,215,681 B1 | * | 4/2001 | Schuuman et al. ......... | 363/141 |

* cited by examiner

Primary Examiner—Robert E. Nappi
Assistant Examiner—Rina I. Duda (57) ABSTRACT

A polyphase inverter employs multiple power semiconductor switches both for its operation and to distribute the current and heat loads for improved operation and cooling. The inherently high currents required for motor operation are divided among a plurality of smaller conductors and semiconductor switches, making a printed wiring board feasible both for power distribution and for control. The approach also permits shorter path lengths to the switches, reduced inductance, faster possible operation of the power switches, and reduced transient activity outside of the immediate switch area. Signals derived from various power points can enable the controller to assess actual current and power distribution and to apportion losses appropriately, or to limit total power output should the losses be deemed excessive.

21 Claims, 9 Drawing Sheets

MOTOR CONTROLLER POWER SWITCH ARRANGEMENT

RELATED APPLICATION

This application is a continuation in part of application Ser. No. 09/392,402 filed on Sep. 9, 1999, now abandoned.

FIELD OF THE INVENTION

The present invention relates to apparatus used to drive a multi-phase motor from a direct current source. In particular it considers not the detailed circuitry, but rather the method and arrangement of the power components and electrical switches used.

BACKGROUND OF THE INVENTION

In the design of inverters for operating multi-phase motors from a DC power source, various types of solid-state or semiconductor switches are employed. Although modern semiconductor switches, such as MOS-FETs have very low losses, the problems caused by the heat losses of the switching devices cannot be avoided when motors of even modest power are controlled.

Traditionally this problem has been solved by employing large heat sinks. These require space that is not always available. Alternatively, liquid cooling has been successful in some cases, but the physical problems of large power conductors used to connect to the high capacity switches remain.

It is a major object of this invention to spread out the sources of heat so as to minimize local heating. In this way the invention allows commercially available components to be combined to produce higher overall power conversion and at higher efficiencies, as well as to minimize the overall size of the conversion apparatus by dividing the requirements among several smaller devices rather than a single massive one.

Objects therefore are to allow the use of multiple smaller switches and electrical conductors in inverters, to allow the use of printed wiring boards in power areas where they would not often be considered feasible, and to remove the heat loss at a multiplicity of points with low temperature rise at each, rather than at a few points with a small number of massive heat sinks.

A further object is to permit certain monitoring of power flow so that the currents and sources of heat can be distributed optimally, and so to compensate for the variations normal in commercially available components.

DESCRIPTION OF PRIOR AND RELATED ART

"Brushless DC Motors" have been available for several years, along with the circuitry for driving them. These systems employ various types of semiconductor switches and switch combinations to convert a direct current source of power into the multi-phase alternating current required by the motor(s). The control switching semiconductors are usually selected to match the voltage and current requirements of the motor, and are mounted to a heatsink which is appropriately cooled so as not to exceed the thermal ratings of the switches.

Usually the power semiconductor heatsink is air cooled, using a fan if necessary to remove the heat. The power supply is connected to the switches by conductors of sufficient size that they can carry the requisite current without themselves contributing excess heat.

In practice, if sufficiently capacious switches are not available several smaller ones may be combined to achieve the higher rating required. However, these arrangements have in the past required greater physical space as well as larger electrical conductors for their interconnection. Also, as the heat sinks become larger physically the electrical inductance is increased and other switching problems develop.

Past systems have relied on "load splitting" or sharing of the capabilities of the various switching elements either on the basis of their being matched physically, being selected for matching characteristics, or by the use of dissipative load-sharing resistors.

SUMMARY OF THE INVENTION

An objective of the present invention is to allow the use of multiple switches in a power inverter, so that the sources of heat can be separated from each other. This allows the use of smaller and less expensive devices, as well as physically realizable devices, in the fabrication of high power inverters.

Another objective is to improve the cooling of the switching elements by permitting multiple heat flow paths from the various switching elements to the heat sink(s).

Another objective is to allow the use of multiple reasonably thin electrical conductors in parallel, rather than the more unwieldy heavy equivalent conductors generally employed.

Another objective is to reduce the inductance of the switching arrangement (and thereby increase its effective switching speed) by allowing each of the switching circuits to be essentially self-contained.

Another objective is to allow monitoring of the power being controlled by each switch, so that the switching signals can be modified to allocate power among them in the most appropriate manner.

Another objective is to actually modify the power switching as described above either to distribute the heat to all switching units equally, or to limit the maximum power in the totality of switches to a safe or appropriate level, since it is well known that most components will experience a longer life if operated below their maximum ratings.

Accordingly, a preferred embodiment consists of a plurality of switches and switching elements, each of which is provided with its own power supply, load conductors, heatsink and current sensing resistor; a logic system for controlling the turn-on and turn-off of the switches as appropriate, based on both command information and feedback from the current sensing resistors, voltage across the closed switch and temperature sensors at each heatsink; and a heatsink suitably arranged to carry off the heat and to provide a safe and reasonable temperature environment for operation of the switches.

Thus, the present invention presents an improvement over existing arrangements, wherein a plurality of electronic switches are arranged and/or mounted in a manner so as to distribute the switch heat losses among a plurality of locations. Each of the electronic switches is provided with its own connections to the power supply, as well as to the motor being controlled. The use of equal length conductors from the power supply to the switches and to the load tends to enhance the equality of load sharing among the multiple electronic switches. This also enables the use of thinner and more flexible conductors, which are more easily handled and terminated, and which permits them to be terminated to a printed wiring board. Printed board mounting is especially important, since the ancillary circuitry needed for control and protection of the power devices can be mounted to the board as well—in close proximity, and with minimal wiring between them. In particular, each switch can have its own power supply filter capacitor (from which surges of current may be drawn) close by. In addition, a smaller capacitor may be mounted directly across the electronic switch (and on the printed board) which can constrain switching transients to the area of the switch itself, preventing them from radiating and in particular preventing them from reaching as far as the current sensing resistor which is used for monitoring the switch current. The novel arrangement allows the electronic switches to be mounted around a portion of the periphery of the motor frame so as to use the motor frame as a heatsink. The arrangement around the motor frame periphery is not critical. A symmetrical arrangement can be used, and such an arrangement provides for good distribution of heat. However, an asymmetric arrangement can also be employed. This use of the motor frame as a heatsink is particularly advantageous if the motor frame is submerged in a fluid, or if it can be liquid cooled. Additional electronic switches can be accommodated by "doubling up" the mounting in pairs, which requires the use of an intermediate heat distributing body to conduct the heat from the electronic switch elements to the motor frame. These can be used as additional switches, or the pairs of elements can be connected electrically in parallel to form each switching element. The arrangement also allows means for sampling or measuring the actual voltage drops across the electronic switches when in their closed state. This voltage drop can be used by the controller to compensate for variations in the "on" resistance of the various electronic switches, and to alter the duty cycles so as to equalize the heat load among them or to shut the system down if this can not be accomplished. To aid in control, the switch output currents can be monitored by an ohmic sensing resistor of low wattage, which can also be mounted to the printed board.

BRIEF DESCRIPTION OF THE DRAWINGS

The arrangement and advantages of the present invention can be better appreciated with reference to the accompanying drawings, of which.

DETAILED DESCRIPTION OF THE EXEMPLARY AND PREFERRED EMBODIMENT

General

The present invention is concerned primarily with advantages which accrue from preferred physical arrangements of the power circuits for an inverter. A secondary benefit allows for the measurement of the current and power in the various controlling electronic switches, and for the control by fine adjustment of these switches so as to achieve various optimizations.

An inverter is required whenever DC (direct current) is used as the power source to operate an AC (alternating current) motor. Modern inverters employ semiconductor power electronic switches, under various types of control, to accomplish this conversion.

The present invention revolves about the arrangement of the power semiconductors and circuits in such inverters, as well as the provision of signals to the control apparatus for optimally "fine tuning" the system to achieve certain performance enhancements.

Typical Power Circuitry

Figure 1:
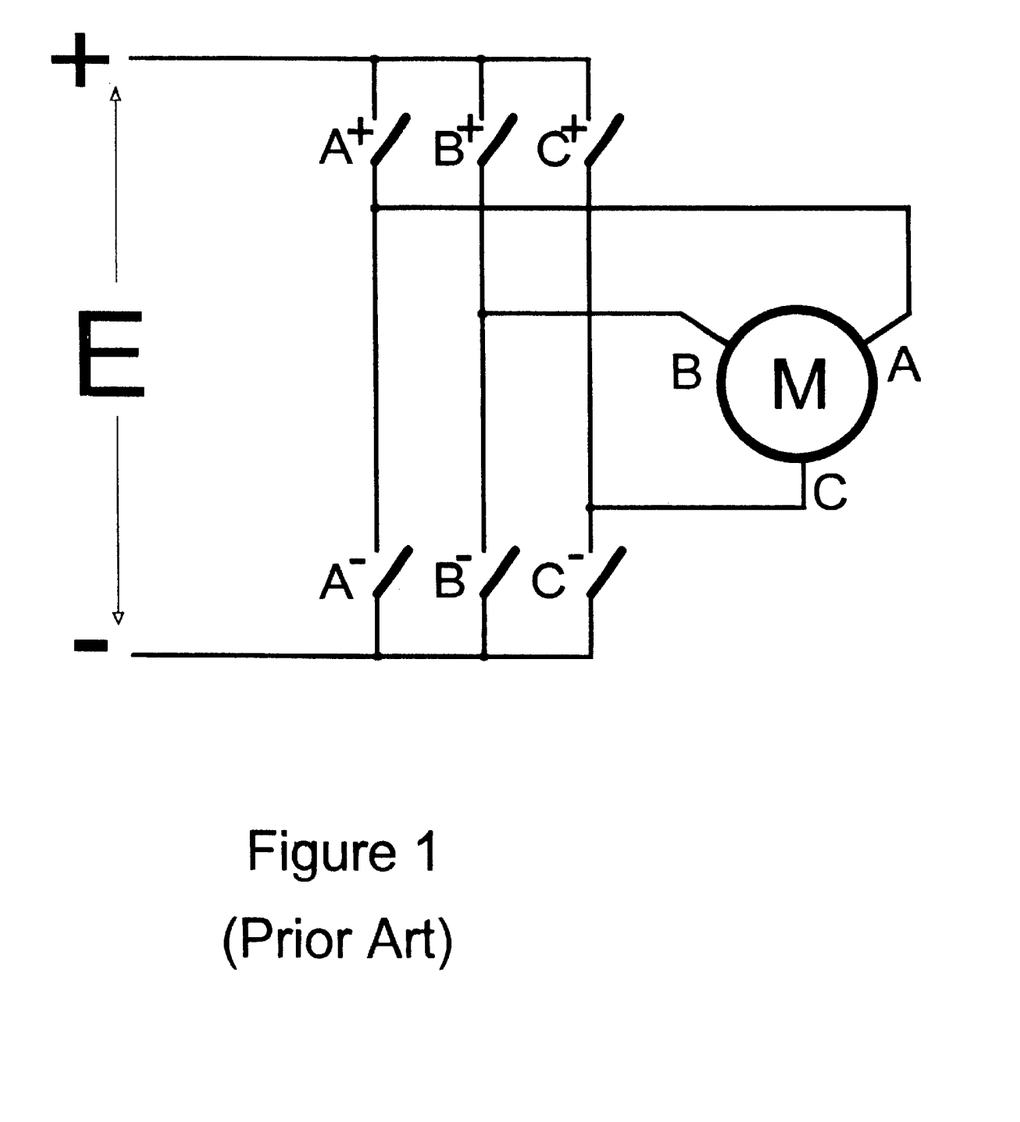
FIG. 1 is a depiction of the power switching portion of a typical three phase inverter employing prior art.

The power switching portion of a typical inverter is shown in FIG. 1. Here the (DC) power supply E is shown as having connections to its terminals "+" and "−" and the driven motor is shown as M. Motor M is typically supplied with one connection per phase, illustrated here as A, B and C. Thus a three phase system requires three motor connections—one for each of the three phases here designated A, B and C. In the present system each of these may further comprise the several conductors of a "multi-filar" motor winding, the breakdown of which is not shown for simplicity.

Each terminal of the motor may be connected to either the positive (E+) or the negative (E−) terminal of the DC power supply E by means of what are referred to herein as electronic power switches. These electronic power switches are designated in FIG. 1 as A+, B+ and C+ (for the positive connections) and A−, B− and C− (for the negative connections.)

In practice, the switches are operated in a defined or programmable sequence so as to produce a rotating alternating voltage to drive the motor in the desired direction.

Protection is also employed to insure that the upper and lower switches of a given phase do not close simultaneously, and create a "short-circuit" across the power supply.

Figure 2:
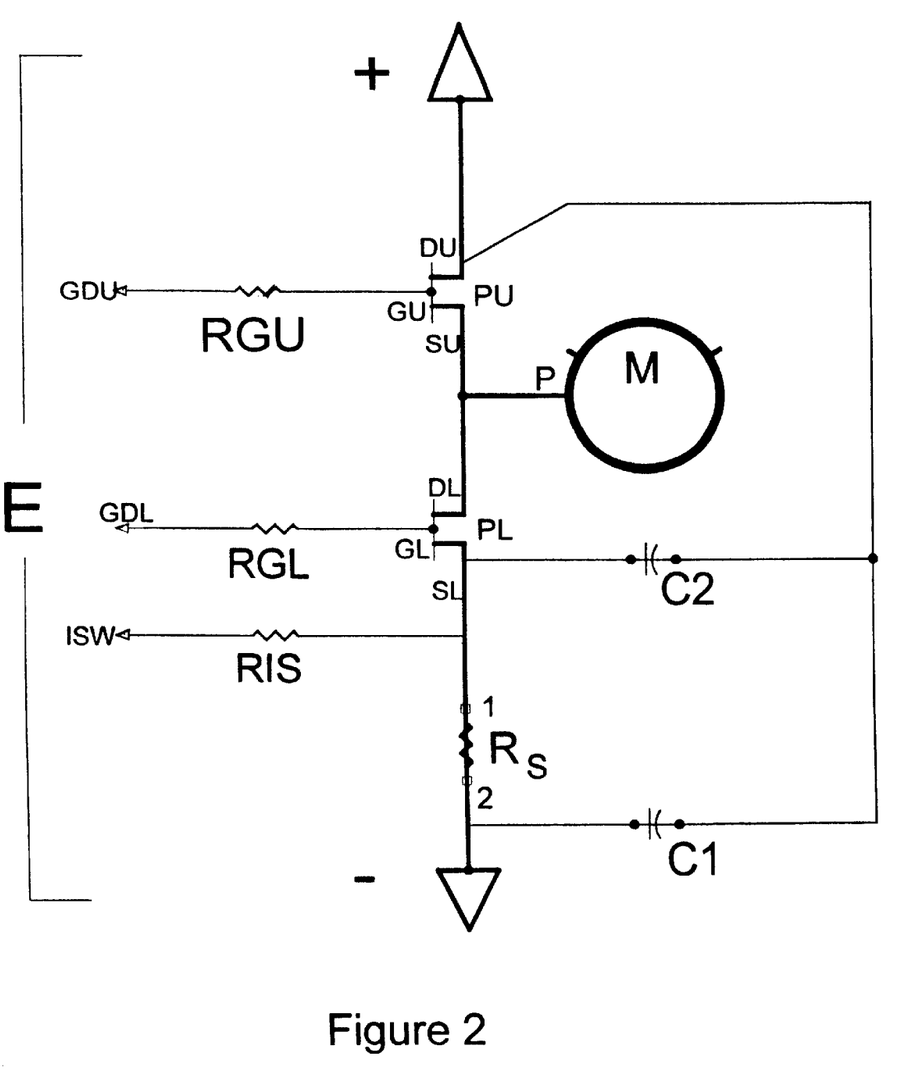
FIG. 2 is a more detailed electrical circuit schematic of a single bi-polar switch in which the components and connections are shown in greater detail.

FIG. 2 shows a typical pair of (upper and lower) electronic power switches in further detail. One such circuit will be used for each phase; three for a three-phase inverter. In FIG. 2 a typical motor phase terminal P is shown connected to a power terminal SU of a corresponding upper power switching device PU as well as to a corresponding terminal DL of a lower power switching device PL. The other power switching terminal DU of PU is connected to one terminal of the source of DC power E+. The other power switching terminal SL of PL is connected to terminal 1 of a low value sensing resistor Rs, and the other terminal (terminal 2) of Rs is connected to the other terminal E− of the source of DC power E. In this manner the phase terminal P can be connected (via the two electronic power switches) to either terminal of the power source. The power conductors, which may carry substantial currents, are shown in FIG. 2 by heavier lines.

Several additional elements are shown in FIG. 2. One of these is capacitor C1 which is connected between power supply terminal E+ and power supply terminal E− to reduce the dynamic impedance of the power supply. Capacitor C2 is a smaller value capacitor connected across the switches, from terminal DU of switch PU to terminal SL of switch PL. The control terminals of the upper and lower switches are correspondingly designated GU and GL, each of which is connected via its corresponding resistor RGU and RGL to its control source GDU and GDL. Resistor RIS, connected to terminal 1 of sense resistor RS permits a measure of the switch current to be conducted out from the switch circuit via point ISW and thence to a control system.

Figure 7A:
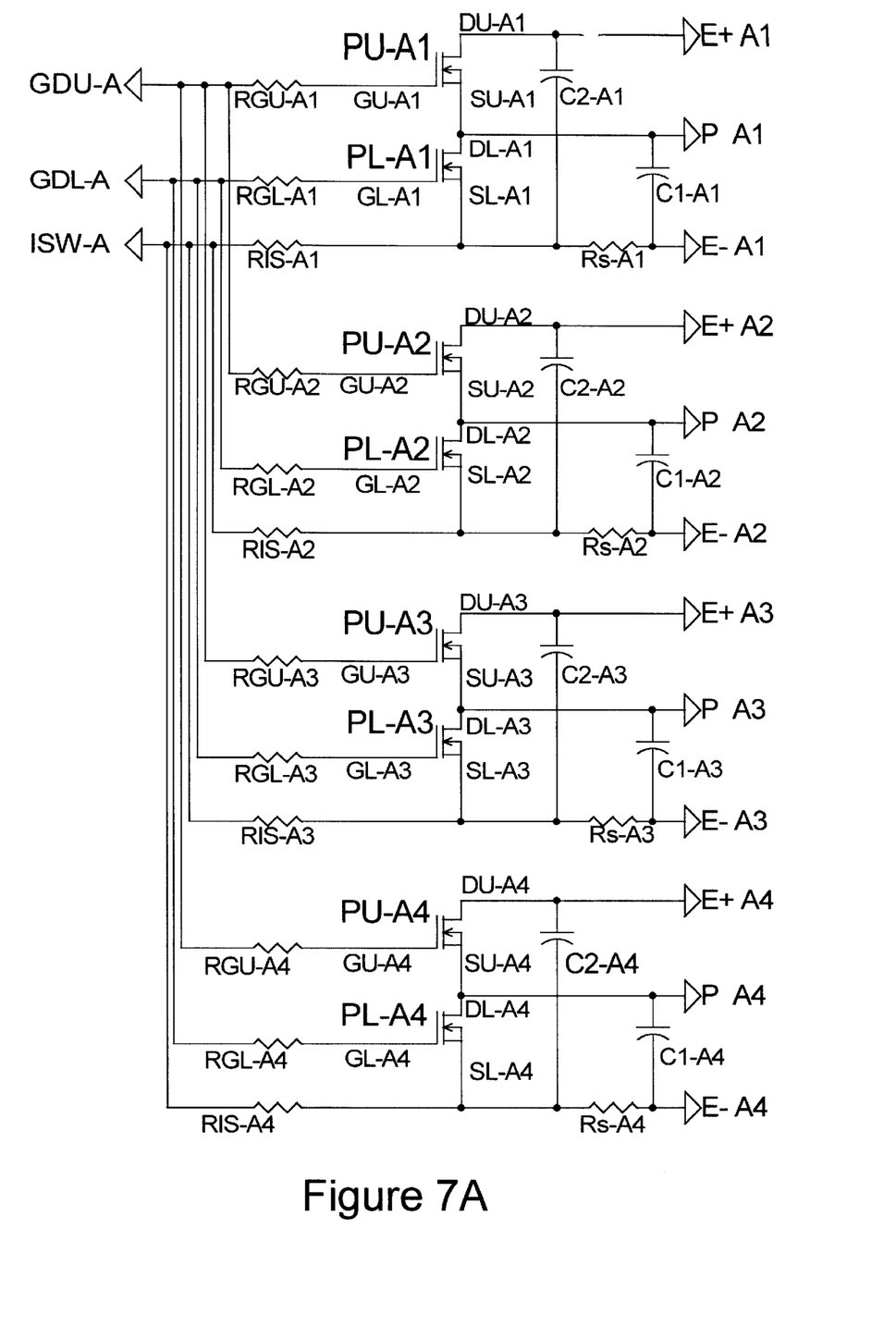
FIGS. 7A, 7B and 7C constitute an electrical schematic diagram for implementing the invention in the three (identical) phases of a power inverter.
Figure 7B:
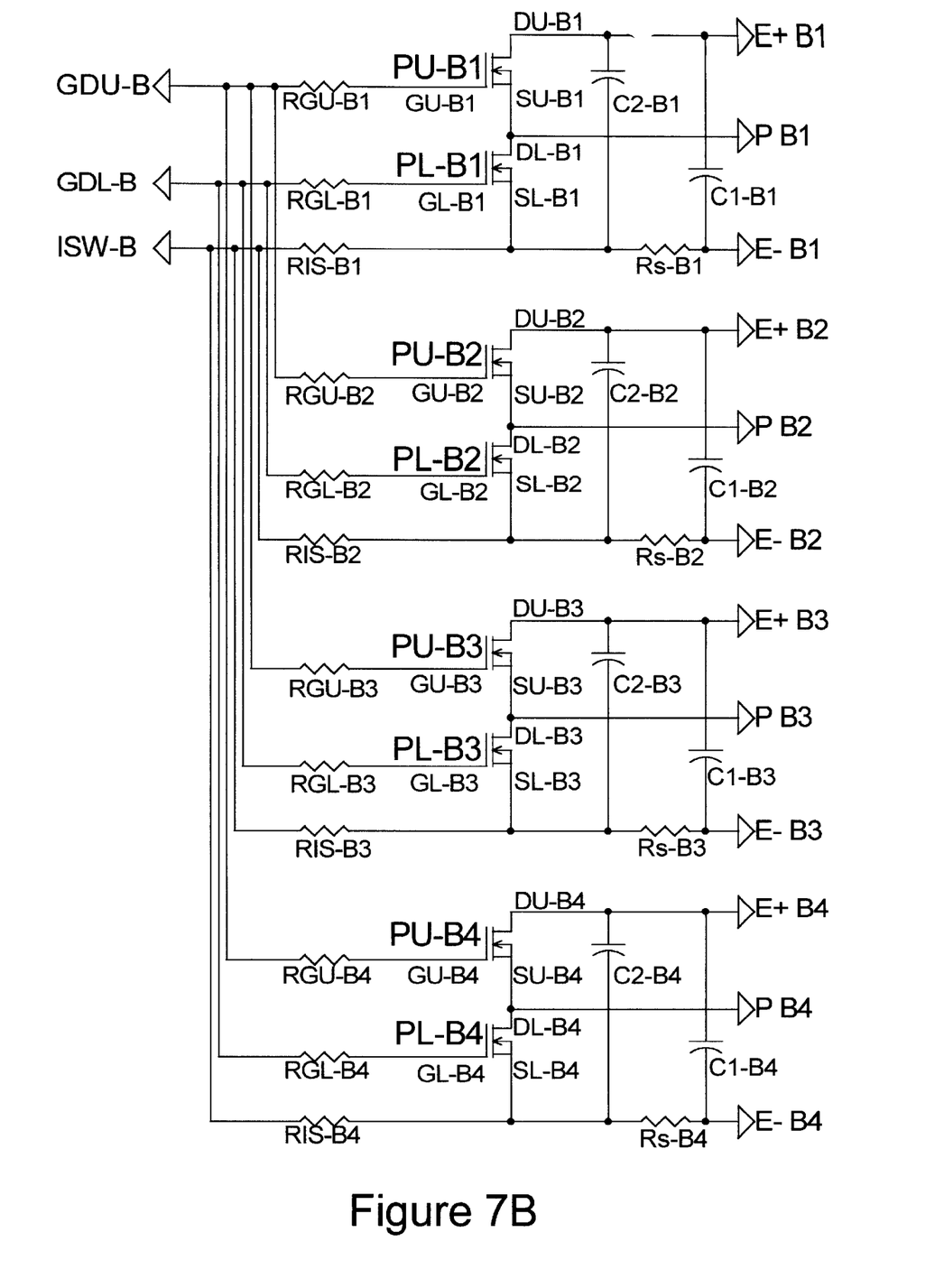
Figure 7C:
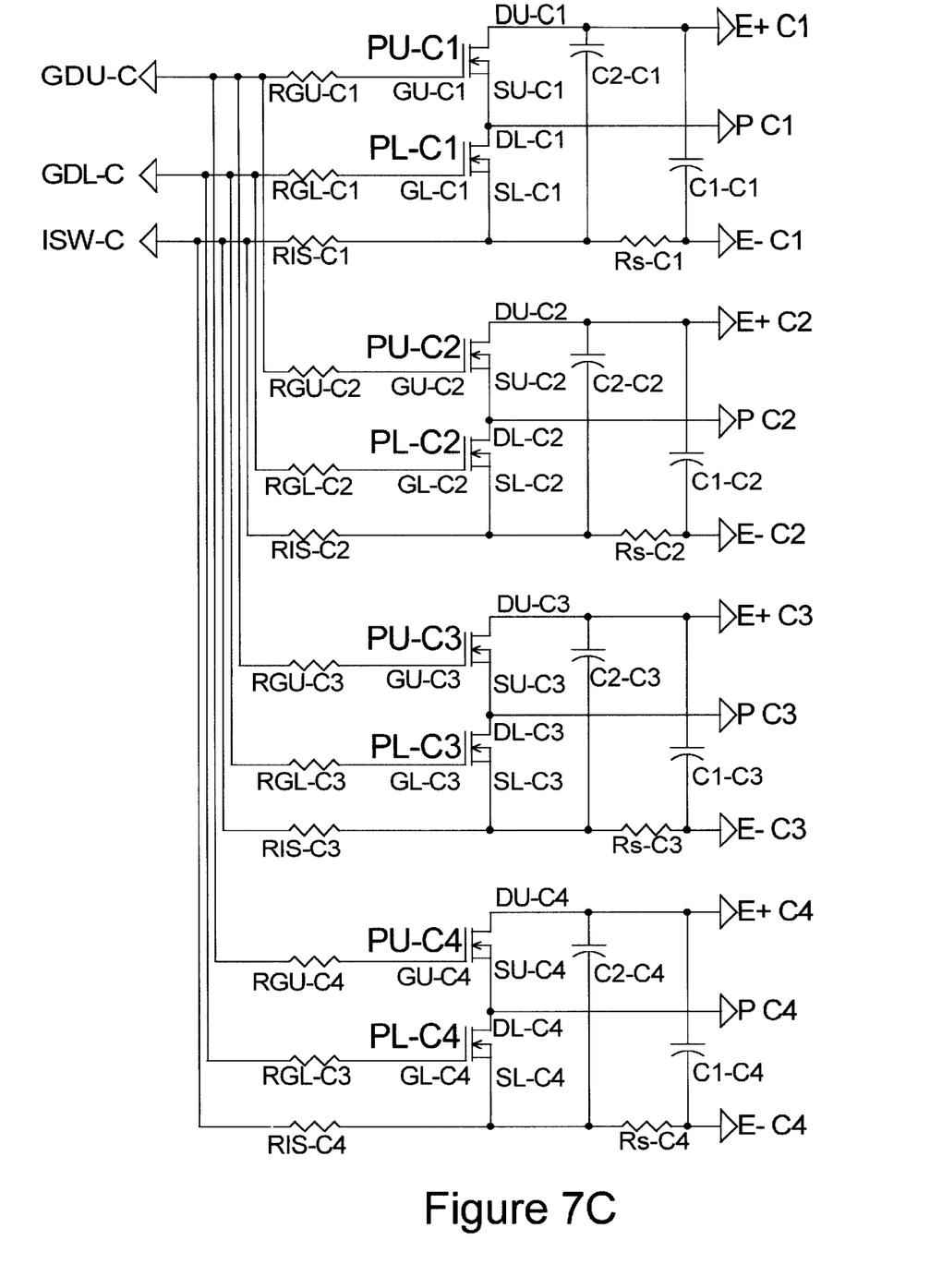

FIGS. 7A, 7B and 7C show a complete rudimentary electrical schematic for the power portion of a practical implementation of the invention to a three-phase motor. The three phases are identical, as are the four electronic switches of each phase; the combination providing further detail to the overviews of FIGS. 1 and 2.

While all the essential elements (and in particular, all the elements of FIG. 2) are shown in FIGS. 7A, 7B and 7C, additional protection and operational components not required for an understanding of this invention are not shown. Some of these, as well as some of the components shown in FIG. 4 would normally be mounted onto a printed wiring board, as illustrated by 102 in FIG. 5.

The upper power switching device PU is broken down in FIG. 7A, into four power switching elements PU-A1 through PU-A4 to illustrate the paralleled upper power switching devices for phase A. Similarly, the upper power switching devices PU for the other two phases are represented by PU-B1 through PU-B4 of FIG. 7B for phase B, and PU-C1 through PU-C4 of FIG. 7C for phase C. In like fashion, the lower power switching devices are shown in FIG. 7A as PL-A1 through PL-A4 representing the lower power switching devices for phase A, PL-B1 through PL-B4 of FIG. 7B representing the lower power switching devices for phase B, and PL-C1 through PL-C4 of FIG. 7C representing the lower power switching devices for phase C.

Figure 6:
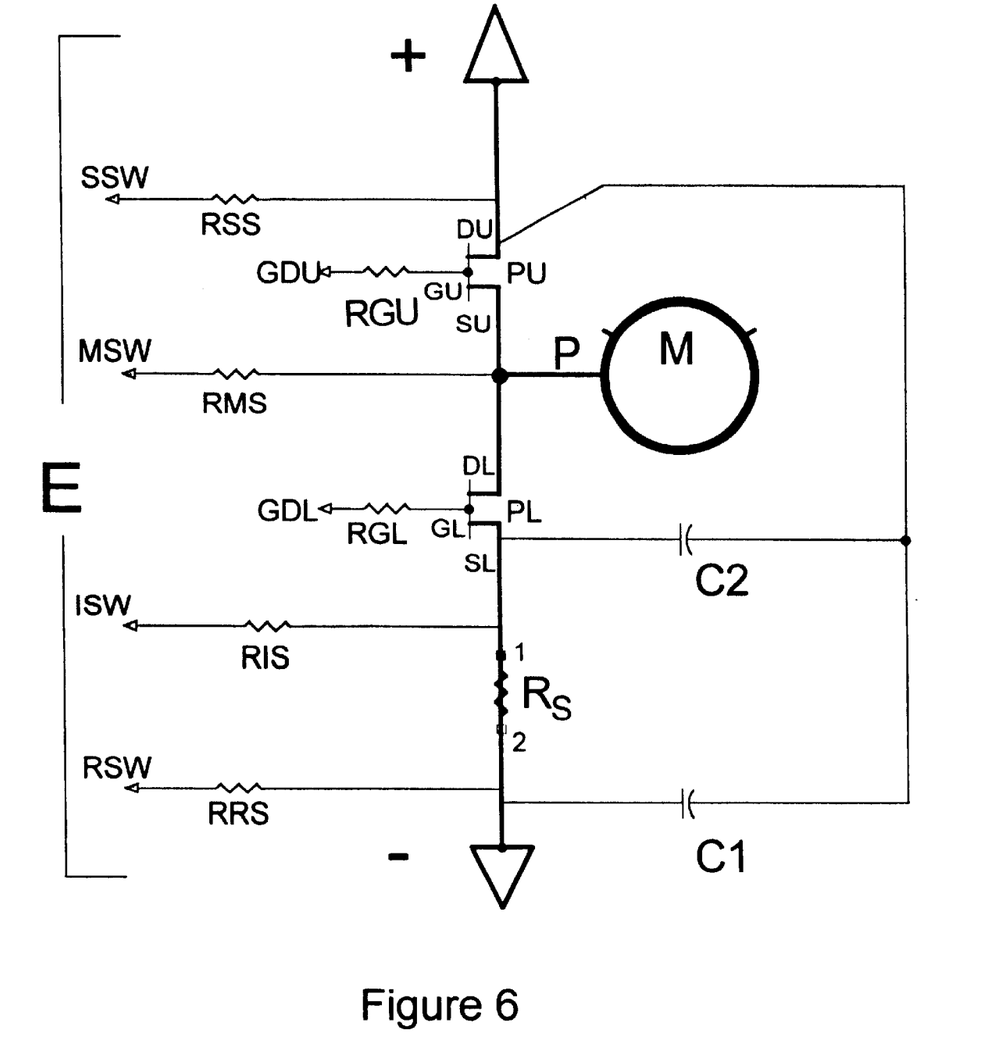
FIG. 6 shows the circuitry of FIG. 2, with additional signals brought out for sensing and measurement.

The low value sensing resistors shown as Rs in FIG. 6 are shown in detail in FIGS. 7A, 7B and 7C as Rs-A1 through Rs-A4 for the sensing resistors Rs of phase A, Rs-B1 through Rs-B4 for the sensing resistor Rs of phase B, and Rs-C1 through Rs-C4 for the sensing resistor Rs of phase C.

The DC power source E which is shown symbolically in FIGS. 1 and 2 is shown with detailed connections in FIGS. 7A, 7B and 7C. Power source E of FIG. 2 has its positive terminal E+ supplied via a separate wire connection to each of the switches for each phase. These connections are shown In FIG. 7A as E+ A1 through E+ A4 for phase A, in FIG. 7B as E+ B1 through E+ B4 for phase B, and in FIG. 7C as E+ C1 through E+ C4 for phase C. Similarly, the connections to the lower or negative terminal of the source of DC power E− are shown in FIGS. 7A, 7B and 7C as E− A1 through E− A4 for the connections of phase A, E− B1 through E− B4 for the connections of phase B, and E− C1 through E− C4 for the connections of phase C.

The phase connections which are shown schematically as P in FIG. 2 are shown in detail in FIGS. 7A, 7B and 7C. These are shown As P A1 through P A4 for phase A, P B1 through P B4 for phase B and P C1 through P C4 for phase C.

While the number of devices and switches used for each phase may be selected as convenient, in the actual implementation a quadrifilar motor was used, with four wires brought out for each phase, providing one wire for each of the 12 switches as shown in FIGS. 7A, 7B and 7C.

Capacitors C1 and C2 of FIG. 2 are shown in further detail in FIGS. 7A, 7B and 7C. Capacitor C1 is shown in FIG. 7A as C1-A1 through C1-A4 for phase A, in FIG. 7B as C1-B1 through C1-B4 for phase B, and in FIG. 7C as C1-C1 through C1-C4 for phase C. Similarly capacitor C2, is shown in FIGS. 7, 7B and 7C as C2-A1 through C2-A4 for phase A, C2-B1 through C2-B4 for phase B, and C2-C1 through C2-C4 for phase C.

The gate drive sources shown schematically in FIG. 2 as GDU and GDL are shown in further detail in FIGS. 7A, 7B and 7C as GDU-A, -B, and -C for the upper gate control source GDU, and GDL-A through GDL-C for the lower gate control source GDL.

The gate drive resistors to the individual power switching devices which are shown in FIG. 2 as RGU and RGL are depicted in detail in FIGS. 7A, 7B and 7C. In FIG. 7A, RGU of FIG. 2 is shown implemented as RGU-A1 through RGU-A4 for the upper gate resistor to the upper gate control source GDU for phase A. Again, in FIG. 7B, RGU-B1 through RGU-B4 represent the resistor RGU of FIG. 2 for phase B, and RGU-C1 through RGU-C4 represent the resistor RGU of FIG. 2 for phase C.

The lower gate to control source resistor RGL of FIG. 2 is similarly represented in FIGS. 7A, 7B and 7C as RGL-A1 through RGL-A4 for the resistor RGL of FIG. 2 for phase A, RGL-B1 through RGL-B4 for the resistor RGL of FIG. 2 for phase B, and RGL-C1 through RGL-C4 for the resistor RGL of FIG. 2 for phase C.

The sensing resistor Rs which is shown in FIG. 2 is also supplied once per switch. In particular, in FIGS. 7A, 7B and 7C sensing resistor Rs of FIG. 2 is shown as Rs-A1 through Rs-A4 for the sensing resistor for phase A, Rs-B1 through Rs-B4 for the sensing resistor of phase B, and Rs-C1 through Rs-C4 for the sensing resistor of phase C.

The current sensing resistor RIS of FIG. 2, which permits a measure of the current in the switch to be measured via point ISW is represented in FIG. 7A as RIS-A1 through RIS-A4 for the resistors of phase A, in FIG. 7B as RIS-B1 through RIS-B4 for the resistors of phase B, and in FIG. 7C as RIS-C1 through RIS-C4 for the resistors of phase C.

The upper and lower power switching devices which have their terminals expressed in FIG. 2 in general terms, similarly have their expanded designations in FIGS. 7A, 7B and 7C. In particular, the source power terminal SU for each power switching device PU is shown as SU-A1 through SU-A4 for the devices of phase A, SU-B1 through SU-B4 for the devices of phase B, and SU-C1 through SU-C4 for those of phase C. The corresponding terminal DL of lower power switching device PL is shown as DL-A1 through DL-A4 for the devices of phase A, DL-B1 through DL-B4 for those of phase B, and DL-C1 through DL-C4 for those of phase C. Power switching terminal SL of the lower power switching device PL is shown as SL-A1 through SL-A4 for the devices of phase A, SL-B1 through SL-B4 for the devices of phase B, and SL-C1 through SL-C4 for the devices of phase C.

Power switching terminal DU of upper power switching device PU in FIG. 2 is shown in FIGS. 7A, 7B and 7C as DU-A1 through DU-A4 for the devices of phase A, DU-B1 through DU-B4 for those of phase B, and DU-C1 through DU-C4 for those of phase C.

The control terminals of the upper switches shown as GU in FIG. 2 are broken down in FIGS. 7A, 7B and 7C to GU-A1 through GU-A4 for the devices of phase A, GU-B1 through GU-B4 for the devices of phase B, and GU-C1 through GU-C4 for the devices of phase C. The control terminals of the lower switches shown as GL in FIG. 2 are shown in FIGS. 7A, 7B and 7C as GL-A1 through GL-A4 for the devices of phase A, GL-B1 through GL-B4 for the devices of phase B, and GL-C1 through GL-C4 for the devices of phase C.

Figure 3:
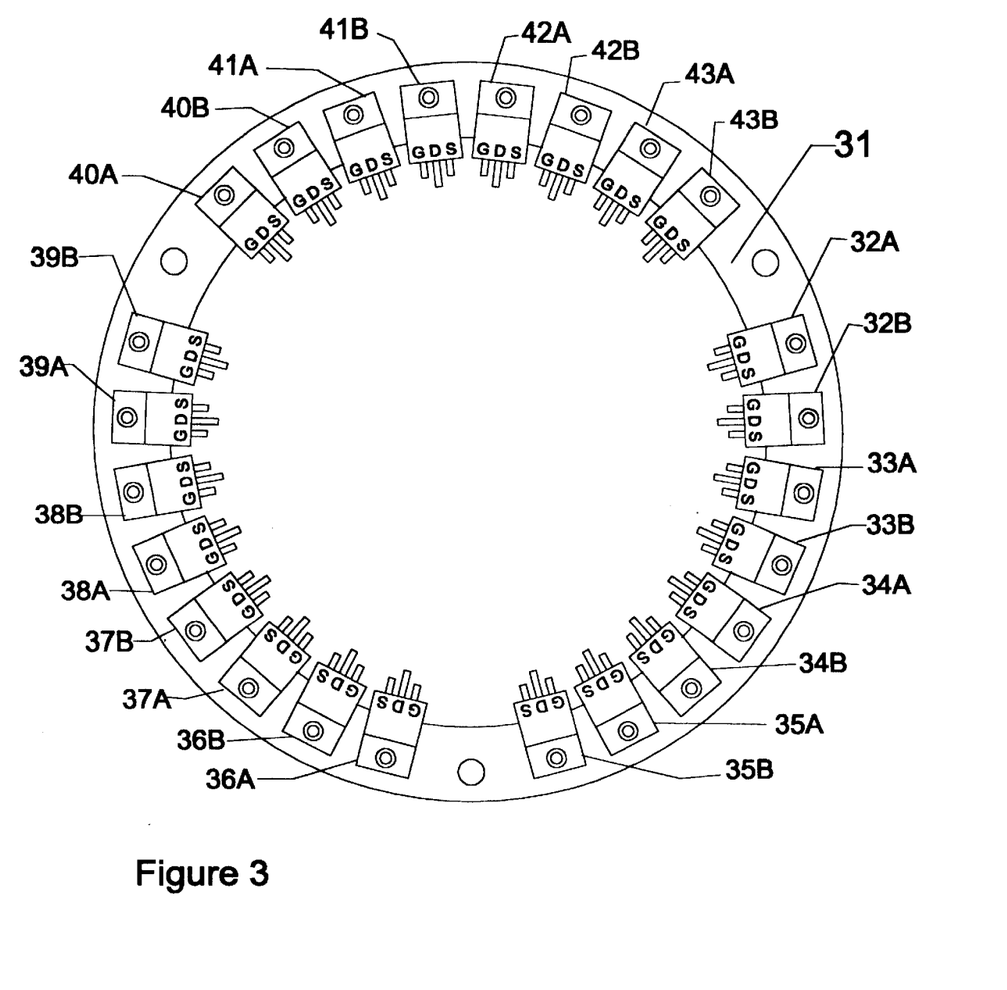
FIG. 3 is an example of a preferred embodiment for the mounting of a plurality of switches.

FIG. 3 shows a typical overall mounting arrangement consisting of three complete electronic switches (one for each phase), each said electronic switch consisting of four switching elements in parallel for each switch function. In this manner the heat losses are distributed to a multiplicity of locations (in the illustration, four times as many as there would be in the normal case), which is a major advantage of the present invention.

In particular, FIG. 3 illustrates the mounting of electronic power control switches (32A, 32B through 43A, 43B) around the periphery of a motor (31), which is a typical application for the present invention. A three phase arrangement is shown which is typical for most power motors.

The 24 power switching devices shown as PU-XX and PL-XX in FIGS. 7A, 7B and 7C correspond to the 24 devices depicted mechanically in FIG. 3, and indicated as 31A, 31B through 41A, 41B. A one-to-one correspondence between the two is not required.

Each pair of switching elements, one PU and one PL has an output to a single motor lead, and the motor is wound in a multi-filar fashion to accommodate this arrangement. Thus, if the motor has three phase terminals, the number of actual motor connections is three times the number of parallel power switches; one each for each pair to the motor and to each of the power supply terminals.

In FIG. 3 there are 12 switches, each consisting of an upper element, e.g. PU-n and a lower element, e.g. PL-n , corresponding to the four switches in parallel for each phase. There are thus 24 individual switching elements, and correspondingly the inevitable losses of the system are distributed among 24 individual sources of heat.

Figure 4:
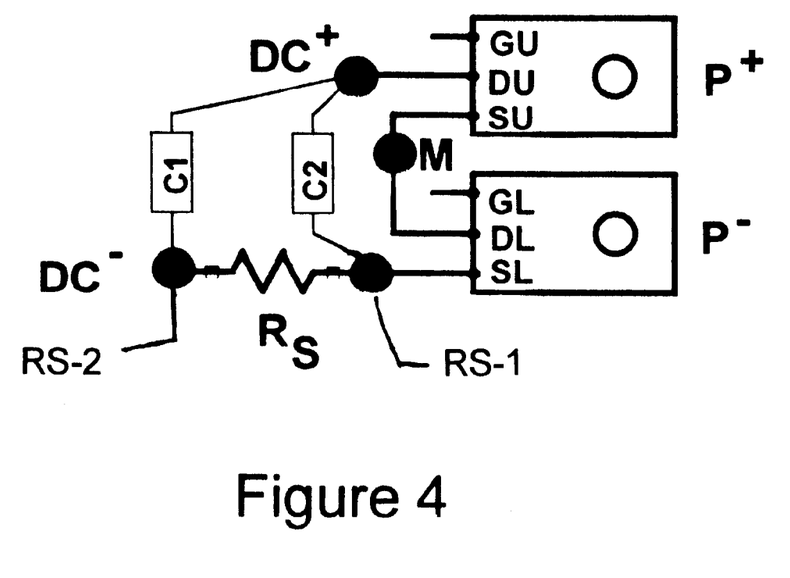
FIG. 4 is an illustration showing in plan view the physical mounting arrangement of a single complete power switch to a printed wiring board, together with its connections to power, load and sensing resistor.

FIG. 4 shows a physical layout of a portion of one single typical complete switch in plan view illustrating how the components would be mounted to a printed wiring board. Printed board entry and exit points for high current connections are shown as DC+, DC−, Rs-1, Rs-2 and M. Only the power handling elements are shown. The control elements are not critical, and can be implemented in various ways by anyone familiar with the motor control art.

In FIG. 4 positive switching element P+ is shown with a connection DU to the positive power supply DC+ (as well as to one side of each capacitor C1 and C2 as described in detail above) and with another connection SU to the motor load M . The negative switching element P− is shown with a connection DL to the same motor load terminal M, and with another connection SL to terminal Rs-1 of the sensing resistor RS as well as to the return side of Capacitor C2.

The other side of sense resistor RS (terminal Rs-2) is connected to the return side of the power supply, DC−. The return side of capacitor C1 is also connected to this same point as directly as possible, so as to keep the dynamic power supply impedance as low as possible.

Many different physical arrangements are possible for the interconnection of the various elements used. FIG. 4 depicts one simple and preferred arrangement whereby capacitor C2 is mounted directly to the terminals DU and SL of the power devices. Similarly, other control or protective devices may be mounted directly to terminals of the power components (as shown in FIG. 4) or to a printed wiring board, such as that illustrated by 102 of FIG. 5.

While no particular type of power switching device is required in the implementation of this invention, the use of MOSFET semiconductors provides an excellent way of sharing current equally among the paralleled elements. In the "ON" state, MOSFETs behave as ohmic resistors. Any paralleled MOSFET having a lower resistance will tend to take a greater current, which increases its temperature, causing its resistance to increase and thus diverting some of the excess current to the other paralleled devices. The sensing resistors Rs and the use of substantially equal length wires to the switches further enhances this tendency toward equitable load sharing regardless of the type of switches actually used. In the event of a significant imbalance of the switches, logic changes can be employed to deliberately distort the current division so as to cause the switch power (or some other parameter) to be divided equally.

The usual method for connecting to both the power and the logic control elements is by means of a printed wiring board, such as 102 of FIG. 5 and shown in plan view in FIG. 4. Each of the power connections (to DC+, DC− and motor M ) for each electronic switch and for each motor lead is accomplished by means of a single wire conductor. An incidental advantage to the use of multiple devices in parallel is that the thickness or area of these conductors is reduced in proportion as the number in parallel is increased. Therefore it is possible to have the power connections on the printed wiring board be made physically either at or very close to the power terminals of the switches and sense resistors to which they connect. This eliminates the need for the printed wiring on the board to conduct any high power currents.

In operation, each element P+ and P− will become a source of heat. These are separated physically by the arrangement described and illustrated, thus tending to accomplish the stated goal of distributing the heat sources and simplifying the task of removing the waste heat due to losses in the switches.

When the power control system of this invention is used with motors, the motor case or housing provides an uncomplicated means for transferring heat to an outside medium. Depending on the size both of the motor and of the switching elements to be employed, there may not be sufficient area around the motor perimeter as shown in FIG. 3 to accommodate the desired number of switches. In this case, the alternative methods of mounting depicted in FIG. 5A and FIG. 5B may be used.

Figure 5A:
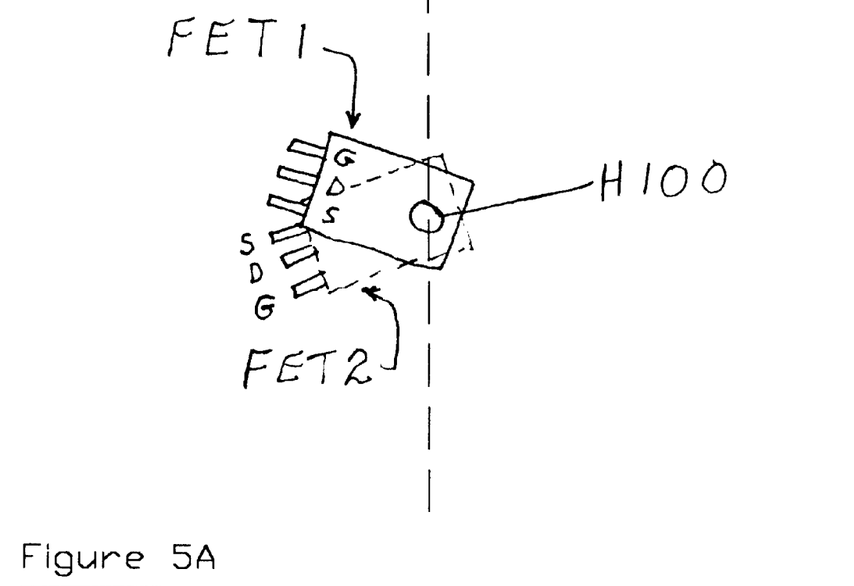
FIGS. 5A and 5B are depictions of alternate arrangements for mounting two power elements together.
Figure 5B:
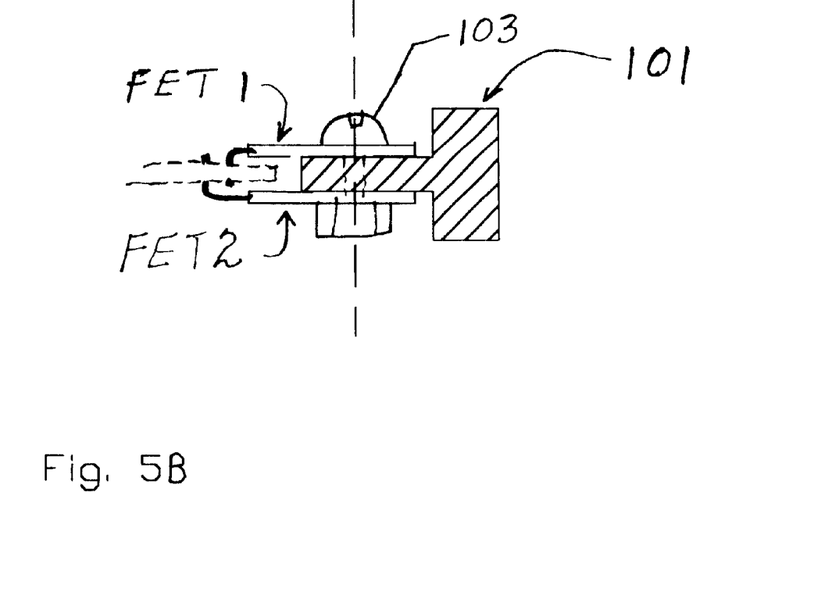

FIG. 5B shows an alternative mounting method for the power switches, whereby a pair of devices may be allowed to share a single mounting location and yet have their electrical connections terminated separately. In this alternate mounting method two switch elements FET1 and FET2 are fastened to the two sides of an intermediate heat conductor 101 by means of a single screw or other fastener 103. This intermediate heat conductor is then to be fastened to the motor casing or other medium which will finally conduct the waste heat away. FIG. 5A is a plan view of a printed wiring board 102, showing a further alternative whereby FET1 and FET2 are mounted through their common mounting holes; aligned and shown as H100. This allows the electrical connections to be terminated separately on different locations of the printed wiring board. In either manner of mounting the switching elements (32A,B to 43A,B of FIG. 3, or FET1, FET2 of FIGS. 5 and 5A), the preferred method of electrical connection is via a printed wiring board; shown as 102 in FIG. 5B.

FIG. 6 shows a modification/extension of FIG. 2, wherein sense signals SSW, MSW, ISW and RSW are brought out from the switch via isolating resistors RSS, RMS, RIS and RRS respectively. (Other corresponding parts have the same designations and functions as in FIG. 2.) The purpose of these signals is to allow a controller to determine the voltage drop across each of the switches during the time it is "on" or "closed." The controller can thus determine if there is a significant difference in the voltage drops across the closed switches, and can vary the switching times to attempt to distribute the power losses equally among the switches. The voltages can also be compared with a standard, and should the power loss be excessive the controller can be set to limit the current to a safe value by reducing the "on" time of the appropriate switches or can shut the system down completely in case a current overload is detected.

The system as actually implemented

In the actual implementation which has been successful in a practical motor drive, the requirement was for fitting a high powered drive to a motor which would be submerged in water. The water acts as an "infinite heat sink," provided that the heat can be conducted first to the periphery of the motor.

The switching components were arranged as in FIG. 3, with the power semiconductors mounted to the end surface of the motor housing, and with a circuit board used for making the appropriate connections occupying the space in the center. Each of the three bi-polar switches required for the three-phase motor is replicated four times, resulting in three groups of 8 power devices each. The motor was correspondingly wound in a quadrifilar fashion, each phase appearing as four individual conductors, or twelve conductors in all.

Pairs of adjacent power semiconductors (MOS-FET) constitute the upper and lower electronic switches of a single switch pair. For each switch pair, three heavy conductors are terminated to the printed wiring board. Each conductor is terminated very close to where its current is again removed from the board, in accordance with the physical layout shown in FIG. 4. Thus the printed wiring is not required to carry high currents. Also, since the motor conductors are one-fourth the thickness which would ordinarily be required, and the power supply conductors are one twelfth the area which would conventionally be used, both the motor wires and the power supply wires can be twisted and bent easily to fit the spaces available.

The capacitors C1 and C2 (each of which is replicated twelve times) are also of smaller size both electrically and physically, and are readily placed very close to their respective switching semiconductors. This minimizes the inductance, inductive transients, and switching time of the switches. The various sensing and driving resistors are easily mounted so as to connect to their associated circuitry which occupies the center portion of the printed wiring board.

The sensing outputs are supplied to the computer type circuitry which is programmed to perform the various protective and distributive functions described elsewhere.

What is claimed is:

1. In a motor control system comprising a power supply, an electric motor, a plurality of electronic switches, and apparatus for the control thereof:
   the improvement wherein said electronic switches are arranged and or mounted in a manner so as to distribute the electronic switch heat losses among a plurality of locations, each said switch comprising a plurality of switching elements connected in parallel.

2. The system of claim 1 wherein each of said electronic switches is supplied with its own connections to the power supply.

3. The system of claim 1 wherein each of said electronic switches is supplied with its own connection to the motor.

4. The system of claim 1 wherein substantially equal length wires to the motor and load serve to enhance the load sharing equally among said electronic switches.

5. The system of claim 1, wherein multiple thinner conductors may be employed to enhance the flexibility of the motor and power conductors.

6. The system of claim 1, wherein said electronic switches are connected to a printed wiring board.

7. The system of claim 1, further comprising circuitry mounted directly to power terminals.

8. The system of claim 7, wherein control and protection circuitry is mounted to a printed wiring board.

9. The system of claim 8, wherein the printed wiring board is in close proximity to the switches being served.

10. The system of claim 1, wherein each electronic switch incorporates its own power supply capacitor.

11. The system of claim 1, wherein each electronic switch employs a small capacitor across the electronic switch to prevent switching transients from appearing in the current sense signal.

12. The system of claim 1, wherein the said electronic switches are mounted to a frame of the motor.

13. The system of claim 12, wherein said electronic switches are mounted symmetrically around at least a partial perimeter of the motor frame.

14. The system of claim 12, wherein the frame of the motor is water-cooled.

15. The switching arrangement of claim 11, wherein said electronic switches are mounted in pairs to an intermediate heat distributing body.

16. The system of claim 15, wherein the pairs of electronic switches are connected electrically in parallel and act as a single switch element.

17. The system of claim 1, further comprising means for measuring the voltage drops across the electronic switches.

18. The system of claim 17, further comprising means for altering the duty cycle of the switches to compensate for variations in switch "on" resistance.

19. The system of claim 17, further comprising means for altering the duty cycle of the switches to distribute the heat load equally among the switches.

20. The system of claim 17, further comprising means for shutting the system down in the event of excessive "on" voltage drop across any switch or combination of switches.

21. The switching arrangement of claim 1, further comprising means for the monitoring of the switch output current via an ohmic sensing resistor.

* * * * *